Dec. 7, 1937.    R. C. MOFFITT    2,101,319
INTERNAL COMBUSTION ENGINE
Filed March 25, 1935    4 Sheets-Sheet 1

INVENTOR
Robert C. Moffitt
BY
Smith & Tuck
ATTORNEYS

Dec. 7, 1937.  R. C. MOFFITT  2,101,319
INTERNAL COMBUSTION ENGINE
Filed March 25, 1935  4 Sheets-Sheet 3

INVENTOR
Robert C. Moffitt
BY
Smith & Tuck
ATTORNEYS

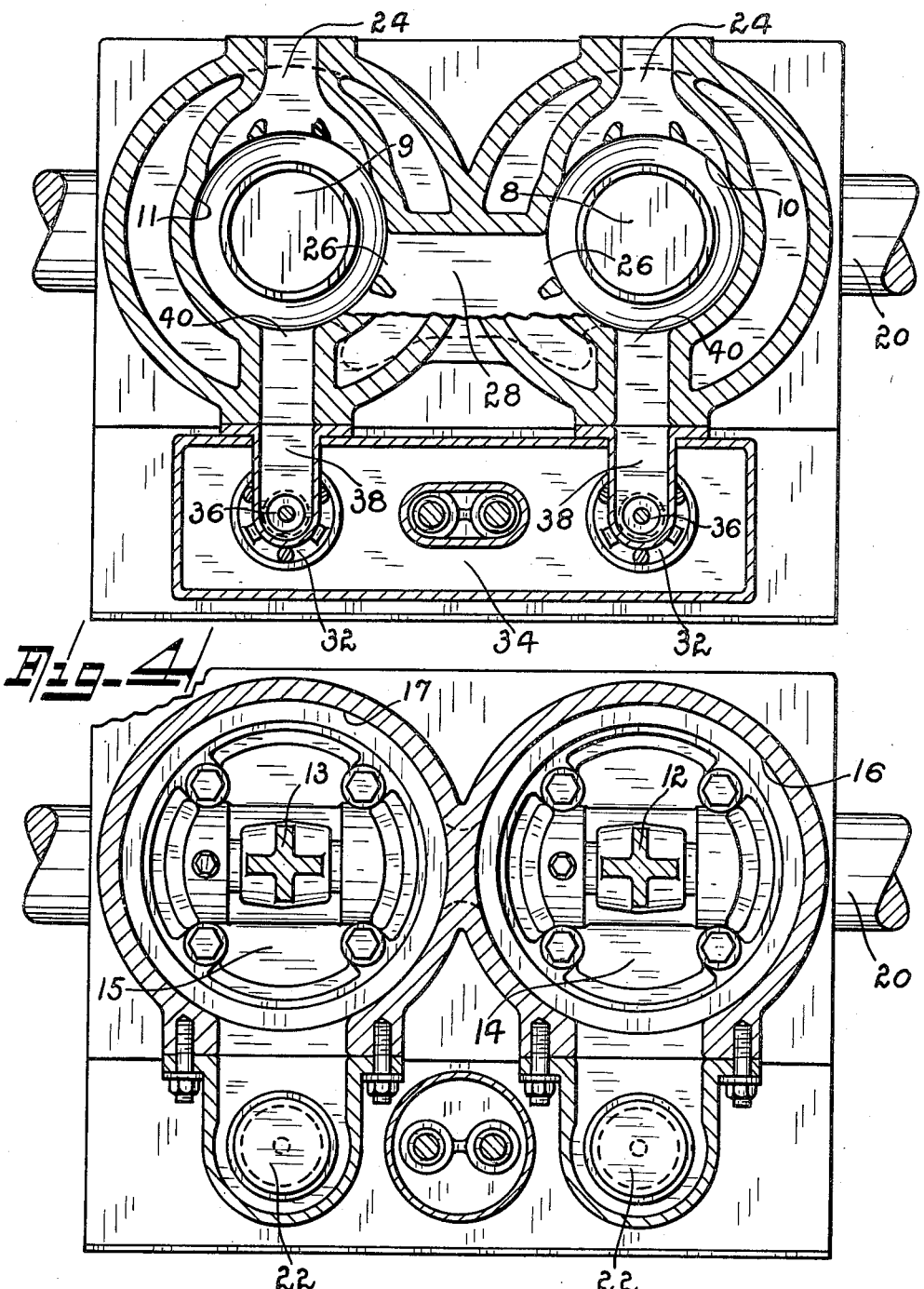

Patented Dec. 7, 1937

2,101,319

UNITED STATES PATENT OFFICE 2,101,319

INTERNAL COMBUSTION ENGINE

Robert C. Moffitt, Seattle, Wash.

Application March 25, 1935, Serial No. 12,988

5 Claims. (Cl. 123—71)

My present invention relates to improvements in internal combustion engines, and more particularly to a method of and means for maintaining uniform temperature in the combustion chambers of such engines.

Considerable difficulty has been encountered, particularly in Diesel engines of the smaller sizes, in providing satisfactory operating conditions under varying speeds and loads. I have corrected this difficulty by providing an automatic supercharging arrangement which without any attention on the part of the operator maintains the uniform condition in the combustion chamber that is so essential to the engine's successful operation.

In a compression ignition or full Diesel engine the air trapped or contained at atmospheric pressure within the power cylinder at or near the bottom of the piston stroke is compressed on the successive up, or compression stroke, of this power piston to a sufficient amount at or near the upper limit of the piston travel to cause the temperature of the contained air to become sufficiently high to cause the ignition of atomized fuel which is injected into this compressed atmosphere at or near the upper limits of the power piston travel. During this compression stroke heat is created in the air and a portion of this heat is given off to the metallic walls and part of the cylinder and contained piston; the amount of heat flow to these parts depends a great deal upon the time interval of this compression period. With a rapidly moving piston a smaller amount of heat is transferred to these engine parts than is the case with a slower moving piston. If the pressure and corresponding temperature of the compressed air is too high there results, on fuel injection, a severe pressure rise causing a vibration knock, commonly termed "detonation". This is caused partly by too rapid burning of the injected fuel and partly by what might be called an "air lock", caused by too high compression. For these reasons it is necessary to limit the compression range within the power cylinder. However, when the engine is operated at slower speeds the compression period is correspondingly lengthened and the amount of heat dissipation to the cylinder and piston is sufficiently increased so that the air temperature at the end of the compression stroke is lowered to a degree sufficient to cause improper ignition of the fuel, injected into this air. This operating condition is a source of trouble in smaller size engines where the ratio of cylinder wall area to cubic capacity is large and where it is desired to operate the engine throughout a wide speed range. This condition may be corrected providing the amount of air to be compressed and trapped within the cylinder is increased in weight as engine speed is decreased, at the proper ratio to the corresponding reduction in engine speed, and inversely of the amount of air to be compressed is decreased in the same ratio, as the engine speed is increased the air temperature at the end of the compression stroke would remain approximately constant; thereby affording nearly ideal conditions for the ignition of the injected fuel.

My present invention is believed to meet these conditions therefore the principal object of my invention is to provide a method and means for maintaining substantially constant temperatures within the combustion chamber of an internal combustion engine by controlling the actual amount of air admitted to the power cylinder.

A further object of my present invention is to provide means for supplying air in addition to that normally taken into the firing chamber by the moving piston and to further control the amount of this additional air so as to preserve a temperature balance within this firing chamber, and to further provide that this operation will be automatically arranged for so that the engine will operate successfully with the minimum of care and attention.

Other and more specific objects will be apparent from the following description taken in connection with the accompanying drawings, wherein—

Figure 1:
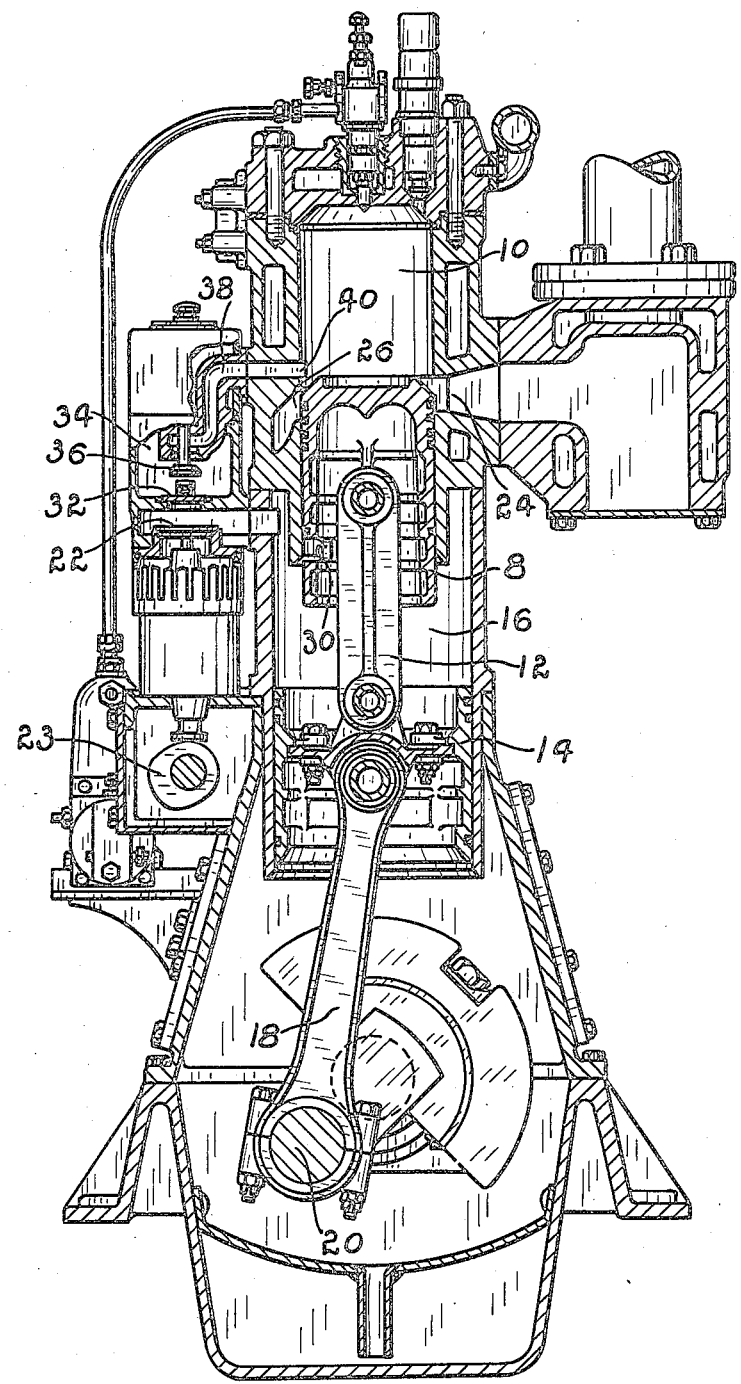
Figure 1 is a vertical transverse sectional view through a two-cycle Diesel engine showing my supercharging means as applied thereto.
Figure 2:
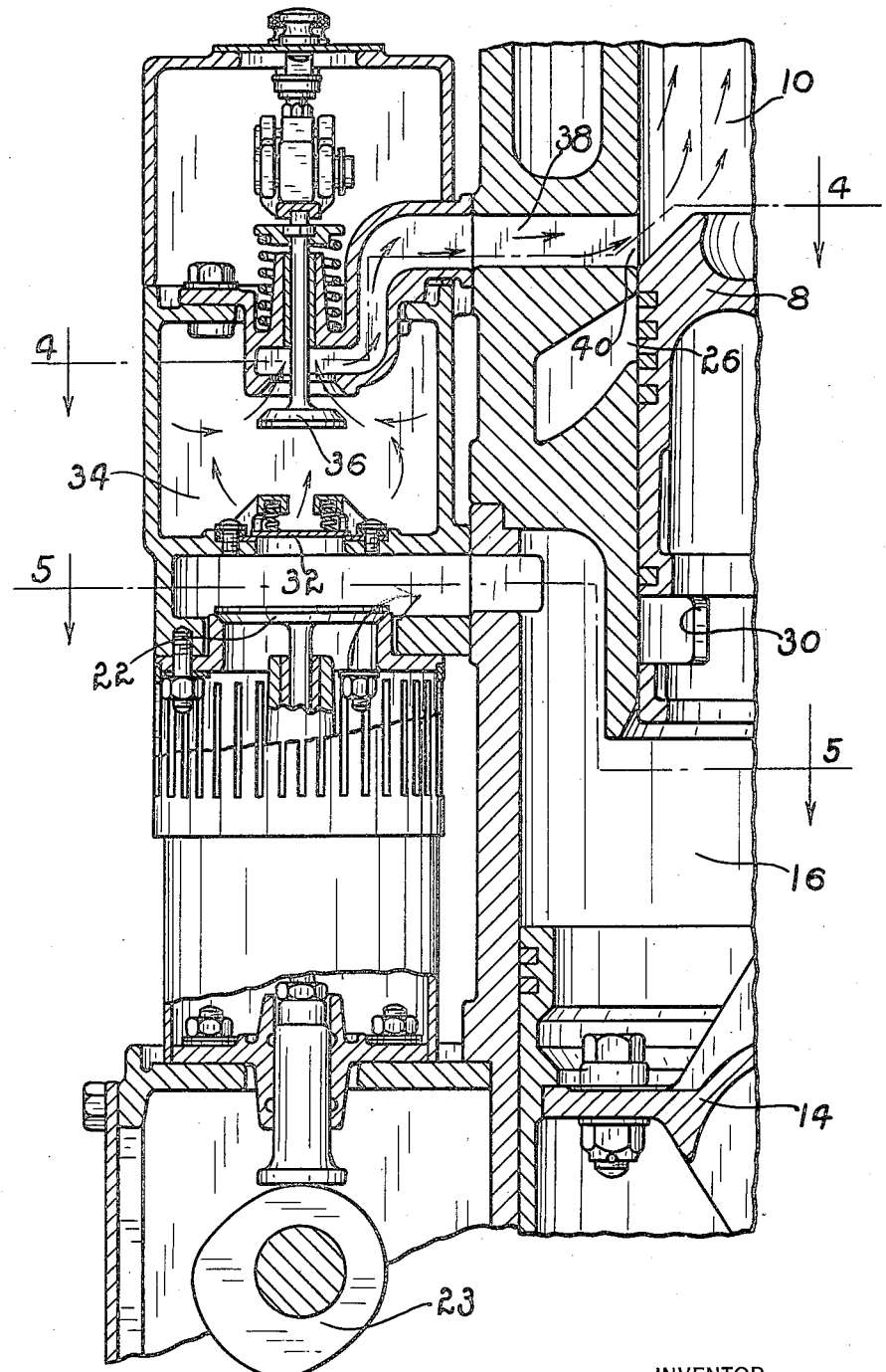
Figure 2 is a fragmentary view taken in the same sense as Figure 1 and showing in enlarged detail, partly in section, certain parts of Figure 1.

Figures 4 and 5 are plan views showing sections taken along the broken lines 4—4 and 5—5, respectively, of Figure 2.

Reference is made to the drawings, throughout which like reference characters indicate like parts. My method of operation involving the supplying and controlling of additional or supercharging air for the control of the combustion chamber temperature can be applied to many types of engines. In the present showing, however, I have, for the sake of simplicity, illustrated my principle as applied to a single type of engine known as a two-stroke cycle, differential-complementary piston type. Reference characters 8 and 9 indicate, respectively, one pair of complementary power pistons adapted for reciprocation within power cylinders 10 and 11. The power pistons are connected through the pivoted connected links 12 and 13 to cross-head or scavenging pistons 14 and 15, respectively, which in turn are adapted for reciprocation within scavenging cylinders 16 and 17. Pistons 14 and 15 are connected, through suitable connecting rods 18, to the engine crank shaft 20.

The general operation of this engine follows that of the usual differential, complementary engine type in that during the power strokes as the pistons are alternately being driven downwardly pistons 14 and 15 take in a charge of scavenging air through valve 22. This valve in the present showing is mechanically operated as by cam 23 which is driven at engine speed. When the power piston 8 has descended sufficiently to uncover the exhaust portion 24 exhaust takes place in a manner common to most two-cycle engines and as the piston progresses further the intake port 26 is uncovered and air, previously compressed by the complemental piston 15, is forced into the firing chamber 10. This transfer is accomplished through ports 26 and passageway 28 which connect the two complementary cylinders 10 and 11. Scavenging air is supplied to cylinder 10 through port 26, from the scavenging cylinder 17 of the complementary cylinder assembly. This transfer is accomplished when a piston reaches its upper position so that port 30 registers with port 26 at one end of passage 28, thus admitting compressed scavenging air, as from cylinder 17, to the other port 26, and thence to the cylinder of the other power cylinder. This operation is more fully and clearly shown in United States Patent Number 1,601,448.

When the scavenging pistons 14 and 15 reach substantially the upper limit of their travel, they alternately pass air under pressure through the spring loaded valves 32 into an air chamber, or receiver 34, which is common to each pair of complementary cylinder assemblies. The pressure of this air represents the extreme pressure created within the scavenging cylinder, and is the air used in supercharging.

Figure 3:
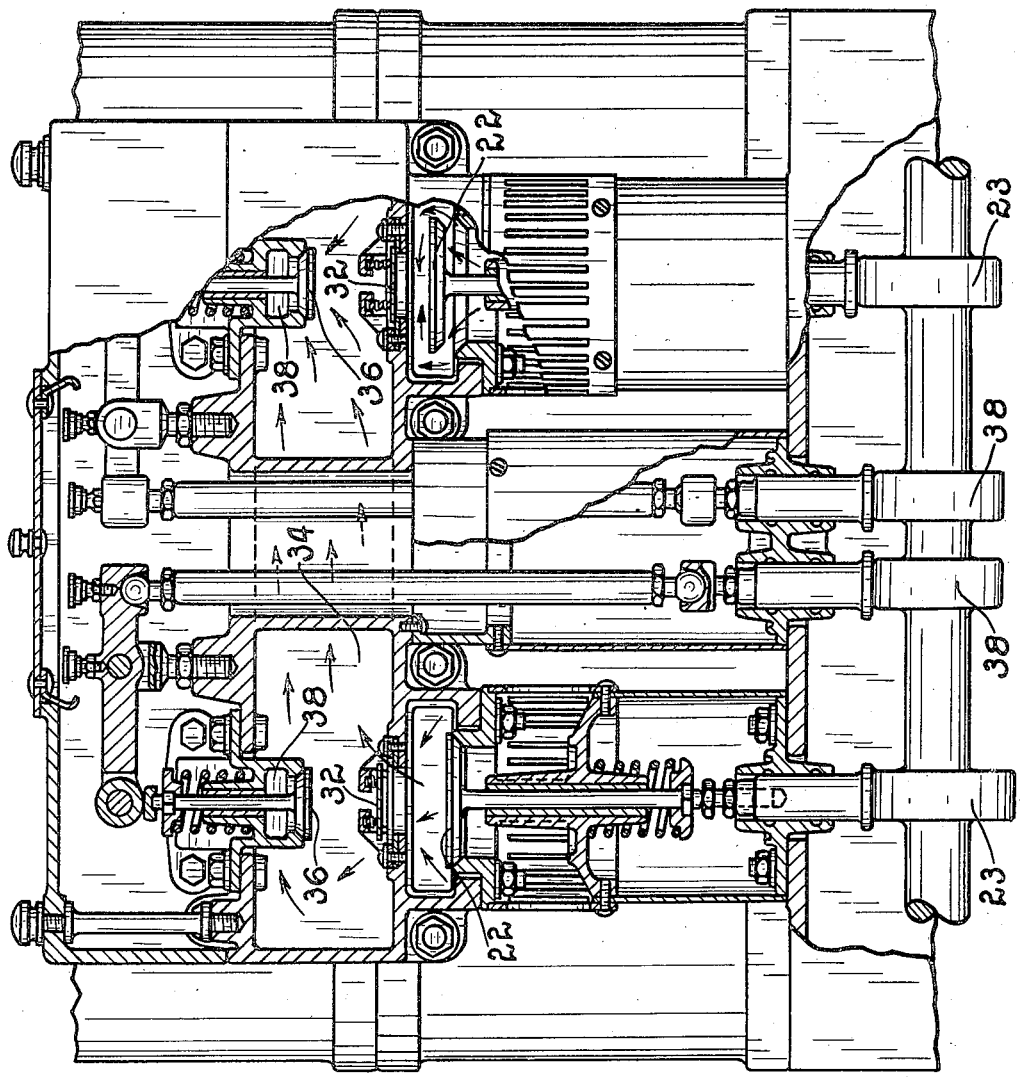
Figure 3 is a side elevation partly in section showing one form of air control means usable with my supercharging arrangement.

When the power piston has advanced up its stroke sufficiently to cover both the exhaust port 24 and the intake port 26 valve 36 is mechanically opened by cam 38 through suitable linkage as that shown, for instance, in Figure 3. As soon as valve 36 is opened the air which is stored under pressure in container 34 is free to flow into the combustion chamber through passage 38 and out through port 40. Now, as the air in chamber 34 is maintained at a constant pressure by virtue of the fact that the two complemental scavenging pistons are continuously building up the pressure therein, the amount of excess air which will flow into the combustion chamber after the normal exhaust and intake ports are closed, will be a function of the time that port 40 remains uncovered. It naturally follows, therefore, that if the engine is operating at reduced speed, more air will be admitted. The effect of this is that after port 40 is closed this increased amount of air which was originally at a higher pressure than the normal scavenging air with which the firing chamber was filled will sufficiently build up the pressure, or volume, or weight of air in the combustion chamber so that when full compression is reached at the upper travel of the power piston an increased temperature will result which will compensate for the greater radiation of heat at the reduced speed. Now, by proper relationship of volumes it is possible to maintain substantially uniform temperatures within the firing chamber and thus accomplish the real purpose of this present invention.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. The combination in an internal combustion engine of a combustion cylinder having an air intake port and exhaust port, a co-axial scavenging cylinder having an air outlet port, an exterior casing forming an air-receiving space open to said outlet port and a cam-actuated valve controlling admission of air to said space, said casing having a compressed-air reservoir and a fluid pressure valve controlling communication between said space and reservoir, and a cam-actuated inlet valve controlling communication between the compressed air chamber and the intake port.

2. The combination in an internal combustion engine, of a combustion cylinder having an air inlet port and an exhaust port, a co-axial scavenging cylinder having an air outlet port, a casing having an air-receiving space open to the outlet port and a compressed air chamber communicating with said space, engine operated means controlling communication between said space and chamber, an intake valve to said space, and an inlet valve between said chamber and the inlet port.

3. The combination in an internal combustion engine, of a combustion cylinder having an air inlet port and an exhaust port, a scavenging cylinder having an air outlet port, an exterior casing having an air-receiving space open to the outlet port and a compressed air chamber communicating with said space, a cam actuated intake valve controlling admission of air to said space, a spring-pressed fluid pressure opened valve between said space and chamber, and a cam actuated valve controlling communication between said chamber and the inlet port.

4. The combination in an internal combustion engine, of a combustion cylinder having an air intake port and an exhaust port, a co-axial scavenging cylinder having an air inlet port, an exterior casing forming an air-receiving space open to said outlet port and a cam actuated valve controlling admission of air to said space, said casing having a compressed-air reservoir and a fluid pressure valve between said space and reservoir, and operating means automatically controlled by the speed of the engine for controlling the charge of air from the compressed air chamber to the intake port.

5. The combination in an internal combustion engine, of a combustion cylinder having an air inlet port and an exhaust port, a co-axial scavenging cylinder having an air outlet port, a casing having an air receiving space open to the outlet port and a compressed air chamber communicating with said space, a valve and operating means therefor controlling communication between said space and chamber, a valve and operating means therefor controlling communication to said space, and an inlet valve between said chamber and the inlet port, whereby air may be supplied to the cylinder in excess of air lost through the exhaust port.

ROBERT C. MOFFITT.